Patented Mar. 29, 1949

2,465,336

UNITED STATES PATENT OFFICE 2,465,336

METHOD OF COATING FABRIC WITH A MODIFIED HALOPRENE COMPOSITION

Robert N. MacDonald, New Castle, and Henry S. Rothrock, Wilmington, Del., assignors to E. I. du Pont de Nemours & Company, Wilmington, Del., a corporation of Delaware No Drawing. Application March 14, 1947, Serial No. 734,848

10 Claims. (Cl. 117—161)

This invention relates to modified haloprene compositions and more specifically to polymers of halogen-2-butadiene 1,3 (called haloprenes) modified with halogenated polyethylene.

The polymerized chloro-2-butadiene 1,3, more commonly known as neoprene, is the most widely known and used of all the haloprenes. Neoprene is noted for its flexibility and resistance to cracking during flexing at low temperatures, a property which is highly desirable where flexible materials are required. There are, however, certain characteristics of neoprene compositions which require further improvement such as for example abrasion resistance which is of prime importance in many industrial applications such as for example, footwear, tires, hoses, wire coatings, coated fabrics, etc. Further improvements are desired in the resistance of neoprene compositions to certain organic fluids commonly used as fuel in internal combustion engines.

More recently, halogenated polyethylene has become available. It is a very stable thermoplastic material but is lacking in abrasion resistance, flexibility and resistance to cracking at low temperatures. Also, the halogenated polyethylene is attached by organic liquids such as toluene and benzene.

An object of this invention is to provide a method of modifying polymerized haloprene compositions to obtain new and useful products. Another object is to provide a method of increasing the abrasion resistance of neoprene compositions without deleteriously affecting the flexibility at low temperatures. A still further object is to provide a method of increasing the resistance of neoprene compositions to organic solvents such as benzene. A still further object is to provide novel modified neoprene compositions of useful properties. Still other objects will appear hereinafter as the description of the invention proceeds.

The objects of this invention are accomplished by mixing a polymerized haloprene with a halogenated polyethylene and then curing the mixture by heating above about 100° C.

It has been discovered that blends of polymerized haloprene and halogenated polyethylene containing as low as 5 parts of halogenated polyethylene to 95 parts of polymerized haloprene up to equal parts yield vulcanizates having far greater abrasion resistance, hardness and insolubility than expected on the basis of the starting materials.

The halogenated polyethylene is a hard, brittle substance at room temperature and it is difficult to work on two roll mills at a temperature which does not result in premature curing of the polymerized haloprene. If the polymerized haloprene is heated to a temperature necessary to render the halogenated polyethylene plastic, it lacks sufficient internal friction to allow the other compounding ingredients to become thoroughly dispersed.

In order to prepare homogeneous dispersions on a two roll rubber mill and to prevent premature curing or scorching of the polymerized haloprene-chlorinated polyethylene compositions of this invention, it is necessary to carry out the mixing operation at relatively low temperatures (approximately 50° C.). Another method of preparing the composition is to mill the haloprene polymer with the secondary compounding ingredients such as pigments, fillers, accelerators, etc. on a cold two roll mill. The halogenated polyethylene is then mixed with the milled haloprene polymer composition together with an organic solvent which is a mutual solvent for the haloprene polymer and halogenated polyethylene to form a substantially homogeneous composition.

Another method of mixing is to pre-mill the polymerized haloprene with the pigments, fillers, accelerators, etc. and then mixing the halogenated polyethylene with the milled haloprene polymer composition in a kneading machine while under pressure and heated sufficiently to just soften the halogenated polyethylene to permit adequate dispersion but insufficiently to cause premature curing of the haloprene. A suitable type of mixing machine for this purpose is known as a Banbury mixer.

The following is a detailed description of various methods of preparing the compositions of this invention.

Example I

An oil and gasoline resistant rubber-like compound was prepared as follows:

| | Parts by weight |
|---|---|
| Neoprene (polymerized chloroprene) | 9.0 |
| Chlorinated polyethylene (55% chlorine) | 4.5 |
| Sulfur | 0.072 |
| Magnesium oxide | 0.9 |
| Neozone D (phenyl, beta, naphthylamine) | 0.072 |
| Stearic acid | 0.144 |
| Cumarone resin | 0.6 |
| Calcium carbonate | 9.0 |
| Carbon black | 11.2 |
| Pine tar | 0.6 |
| Zinc oxide | 0.9 |
| Rosin | 0.6 |

The neoprene and chlorinated polyethylene were milled together on a two roll rubber mill at 50° C. but did not appear entirely compatible at this stage of manufacture. It was not possible to heat the composition sufficiently to render the chlorinated polyethylene plastic without scorching the neoprene. The remaining ingredients were then added in the order listed and the milling continued until a substantially homogenous composition was obtained. At this stage of manufacture, the composition was relatively hard and somewhat brittle and not as tacky as a control sample which differed only in that the chlorinated polyethylene was omitted and the remaining ingredients were present in the same ratios as listed above. The milled composition containing the chlorinated polyethylene was sheeted and then vulcanized at 142° C. for 50 minutes.

*Example II*

A control sample for Example I was prepared in the same manner as described in Example I except the chlorinated polyethylene was omitted. All other ingredients were present in the same ratios as described in Example I.

The chlorinated polyethylene in the above examples may be prepared in the manner described in U. S. Patent 2,183,556 or 2,398,803. The neoprene (polymerized chloroprene) is described in U. S. Patent 1,967,863.

The following test results were obtained with the vulcanized compounds described in Examples I and II.

|  | Example I | Example II, control |
|---|---|---|
| Ratio of Chlorinated Polyethylene to Neoprene | 1:2 |  |
| Film Thickness inches | .081 | .095 |
| Tensile Strength p.s.i. | 1,270 | 1,319 |
| Volume Increase After 48 Hour Soak in Benzene per cent | 114 | 144 |
| Loss in Weight After 48 Hour Soak in Benzene and then dried per cent | .8 | 1.9 |

The following additional examples were prepared by providing a master batch of neoprene, pigments, fillers, and accelerators prepared by milling the following ingredients together on a cold two roll mill:

Master Batch:
Parts by weight
Neoprene ------------------------------------ 400
Zinc oxide ---------------------------------- 180
Magnesium oxide ---------------------------- 150
Calcium carbonate --------------------------- 150
Colored pigments ---------------------------- 60

940

The master batch was then dissolved in xylol along with chlorinated polyethylene (68% chlorine) in several ratios as outlined below:

| Example | III, Control | IV | V | VI | VII |
|---|---|---|---|---|---|
| Ratio of Neoprene to Chlorinated Polyethylene |  | 95/5 | 85/15 | 66.7/33.3 | 50/50 |
| Master Batch by Wt. | 200 | 200 | 200 | 200 | 200 |
| Chlorinated Polyethylene (68% Chlorine) Parts by weight |  | 4.5 | 15 | 42.5 | 85 |
| Xylol do | 250 | 250 | 250 | 250 | 250 |

Each formulation was mixed until thoroughly dispersed, then films were cast on a glass plate and after the solvent was removed by evaporation, the films were press cured 45 minutes at 307° F. under a pressure of 2,000 lbs. per square inch and a thickness of .090″.

The following test results were obtained on the various films:

| Example | III, Control | IV | V | VI | VII |
|---|---|---|---|---|---|
| Ratio of Neoprene to Chlorinated Polyethylene |  | 95/5 | 85/15 | 66.7/33.3 | 50/50 |
| Shore A Durometer Hardness | 72 | 73 | 77 | 82 | 89 |
| Modulus at 100% Elasticity p.s.i. | 510 | 490 | 650 | 610 | 730 |
| Tensile Strength do | 1,940 | 1,390 | 1,040 | 810 | 770 |

The compositions (Examples III to VII) described above were also coated on a woven cotton fabric with a sateen weave running 1.12 yards per pound per 53″ width in a plurality of coats by means of a doctor knife. Sufficient coats were applied to deposit approximately 13 ounces of nonvolatile components per yard 50″ wide. The coated fabrics were cured for 2 hours at 260° F. The following test results were obtained on the coated fabric samples:

| | III, Control | IV | V | VI | VII |
|---|---|---|---|---|---|
| 4 lb. Edge Wear | 500 | 900 | 1,200 | 2,000 | 10,000 |
| Wyzenbeck Abrasion No. of Oscillations Before Coating Wears Through (240J Emery Paper) | 1,000 | 2,000 | 3,000 | 5,000 | 5,000 |

A description of the "Wyzenbeek Abrasion Test" will be found in paragraph F-29, Federal Specification KK-L-136b for leather; artificial (upholstery) dated October 8, 1945.

The "Edge Wear test" is conducted with the Wyzenbeek abrasion apparatus in which the abrading surface is #10 duck and 2″ x 4″ sample to be tested is stretched over a curved surface in such a manner that an area of approximately ⅛″ by 2″ is pressed against the #10 duck with a 4 lb. weight. The sample is held stationary and the #10 duck is rocked back and forth through approximately a 22½° arc.

In all the above examples, only the chlorine substituted butadiene polymer known as neoprene is disclosed. However, similar halogen substituted butadiene polymers such as polymerized bromo-2-butadiene-1,3 are generally applicable for use in the compositions of this invention. The invention will be considered as including within its scope all halogen-2-butadiene-1,3 polymers for the purposes described. The halogen-2-butadiene-1,3 polymers are described in U. S. Patent 1,967,863 and several applications mentioned in the patent.

In the above compositions, brominated polyethylene can be used in place of chlorinated polyethylene with comparable results. In general, in preparing films containing brominated polyethylene a slightly greater amount of the brominated polymer will be required than the chlorinated polymer to obtain compositions of comparable properties due to the atomic weight of bromine being greater than chlorine. As indicated in the various examples, the ratio of halogen-2-butadiene 1,3 to the halogenated polyethylene may vary between 95:5 and 50:50.

The degree of abrasion resistance of the compositions of this invention will vary with the halogen content of the halogenated polymer. The minimum amount of halogen in the halogenated polyethylene which results in the most useful compositions for abrasion resistance appears to be approximately 25% and the maximum approximately 72%. The preferred range of halogen in the halogenated polyethylene is 40% to 70%. In general, the abrasion resistance of the compositions will increase with the amount of halogen in the halogenated polyethylene. Therefore, it is more advantageous to use the higher halogen containing polymers where the halogenated polyethylene content is low.

The outstanding property realized by blending neoprene and chlorinated polyethylene is abrasion resistance. This is particularly surprising and unexpected in view of the properties of neoprene and chlorinated polyethylene. The compositions of this invention will find utility for any application of neoprene where improved abrasion resistance is desired. The potential end products include tires, printing rolls, printer's blanket, floor covering, hose, industrial coated fabrics, gaskets, unsupported film and sheet stock and many molded articles. The coated fabrics of this invention are particularly useful for upholstery material where heavy duty material is required such as, e. g., truck seats, theater seats, or wherever coated fabric upholstery material has been used in the past. The oil and hydrocarbon resistance of the compositions of this invention make them particularly useful for fuel pump diaphragms, fuel tanks, tubing, etc.

It is apparent that many widely different embodiments of this invention may be made without departing from the spirit and scope thereof, and therefore, it is not intended to be limited except as indicated in the appended claims.

I claim:

1. A composition of matter which yields on curing a tough, dense, highly abrasion-resistant film; comprising polymerized halogen-2-butadiene 1,3 and halogenated polyethylene, the ratio of the ingredients being between 95 parts of halogen-2-butadiene 1,3 to 5 parts of halogenated polyethylene and equal parts of the two polymers, the halogen of both polymers being selected from the group consisting of chlorine and bromine.

2. The composition of claim 1 in which the mixture is vulcanized.

3. The composition of claim 1 in which the halogen is chlorine.

4. The composition of claim 1 in which the halogen is bromine.

5. A fabric having an adherent coating of the vulcanized composition of claim 1.

6. The composition of claim 1 in which the halogen content of the halogenated polyethylene is between 25% and 72%.

7. The composition of claim 1 in which the halogen in both polymers is chlorine, and the chlorine content of the chlorinated polyethylene lies between 40% and 70%.

8. A composition of matter having the following composition by weight:

| | |
|---|---|
| Chlorine-2-butadiene 1,3 plastic polymer | 9.0 |
| Chlorinated polyethylene (55% chlorine) | 4.5 |
| Sulfur | 0.072 |
| Magnesium oxide | 0.9 |
| Phenyl, beta, naphthylamine | 0.072 |
| Stearic acid | 0.144 |
| Cumarone resin | 0.6 |
| Calcium carbonate | 9.0 |
| Carbon black | 11.2 |
| Pine tar | 0.6 |
| Zinc oxide | 0.9 |
| Rosin | 0.6 |

9. The method of preparing tough, dense, abrasion-resistant films which comprises milling a halogen-2-butadiene 1,3 plastic polymer with a halogenated polyethylene at a temperature below 50° C., adding conventional stabilizers, antioxidant, accelerators and vulcanizing agents, continuing the mixing until the mass is homogeneous, rolling the same out into a sheet and thereafter vulcanizing the same by heating to above 100° C., the ratio of the ingredients being between 95 parts of halogen-2-butadiene 1,3 to 5 parts of halogenated polyethylene and equal parts of the two polymers, the halogen of both polymers being selected from the group consisting of chlorine and bromine.

10. The process of preparing coated fabrics which comprises milling a composition having the following formula by weight:

| | |
|---|---|
| Chlorine-2-butadiene 1,3 plastic polymer | 400 |
| Zinc oxide | 180 |
| Magnesium oxide | 150 |
| Calcium carbonate | 150 |
| Pigments | 60 | adding 42.5 parts of 68% chlorinated polyethylene to 200 parts of the above mixture together with a solvent, applying sufficient coats thereof to deposit 13 ounces of non-volatile components per yard of 50" width to a sateen cotton fabric, and thereafter vulcanizing the coating by heating for 2 hours at 260° F.

ROBERT N. MacDONALD.
HENRY S. ROTHROCK.

REFERENCES CITED

The following references are of record in the file of this patent:

UNITED STATES PATENTS

| Number | Name | Date |
|---|---|---|
| 1,967,863 | Collins et al. | July 24, 1934 |
| 2,188,396 | Lemon | Jan. 30, 1940 |
| 2,261,760 | Habgood | Nov. 4, 1941 |
| 2,278,833 | Crawford | Apr. 7, 1942 |
| 2,416,069 | Scott | Feb. 18, 1947 |
| 2,422,919 | Myles et al. | June 24, 1947 |